(12) United States Patent
Iwami et al.

(10) Patent No.: US 10,970,147 B2
(45) Date of Patent: Apr. 6, 2021

(54) ELECTRONIC CONTROL DEVICE AND OPERATION CONTROL METHOD THEREFOR

(71) Applicant: Mitsubishi Electric Corporation, Tokyo (JP)

(72) Inventors: Eiji Iwami, Tokyo (JP); Munenori Yamamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 67 days.

(21) Appl. No.: 16/074,460

(22) PCT Filed: May 24, 2016

(86) PCT No.: PCT/JP2016/065288
§ 371 (c)(1),
(2) Date: Aug. 1, 2018

(87) PCT Pub. No.: WO2017/203596
PCT Pub. Date: Nov. 30, 2017

(65) Prior Publication Data
US 2019/0073256 A1    Mar. 7, 2019

(51) Int. Cl.
*G06F 11/00* (2006.01)
*G06F 11/07* (2006.01)
(Continued)

(52) U.S. Cl.
CPC ............ *G06F 11/0751* (2013.01); *B62D 1/00* (2013.01); *B62D 5/046* (2013.01); *B62D 5/049* (2013.01);
(Continued)

(58) Field of Classification Search
CPC ............ G06F 11/0751; G06F 11/0766; G06F 11/0769; G06F 11/0772; G06F 11/0775;
(Continued)

(56) References Cited

U.S. PATENT DOCUMENTS 5,677,611 A    10/1997    Yoshihara et al.
2002/0133735 A1*    9/2002    McKean ............. G06F 11/2092
                                                                714/5.11
(Continued)

FOREIGN PATENT DOCUMENTS

| JP | 09-023501 A | 1/1997 |
|---|---|---|
| JP | 3679700 B2 | 8/2005 |
| WO | 2015/141254 A1 | 9/2015 |

OTHER PUBLICATIONS

International Search Report of PCT/JP2016/065288 dated Aug. 23, 2016.
(Continued)

*Primary Examiner* — Sarai E Butler
(74) *Attorney, Agent, or Firm* — Sughrue Mion, PLLC; Richard C. Turner (57) ABSTRACT

An abnormality determination means performs detection of abnormality of one of the pairs of detection means at a normal speed, and performs detection of abnormality of the other of the pairs at a speed not higher than the normal speed, and, when a sign of abnormality of the detection means is detected at the normal speed, a CPU performs switching to the other normal pair and continues control, and the abnormality determination means performs detection of abnormality of the other normal pair at the normal speed, (Continued)

and meanwhile, continues to perform detection of abnormality of the abnormal pair at a speed not higher than the normal speed.

19 Claims, 9 Drawing Sheets

(51) Int. Cl.
| | | |
|---|---|---|
| *H02P 6/00* | (2016.01) | |
| *B62D 1/00* | (2006.01) | |
| *H02P 25/26* | (2006.01) | |
| *B62D 5/04* | (2006.01) | |
| *H02P 6/16* | (2016.01) | |
| *H02P 6/06* | (2006.01) | |
| *H02P 6/18* | (2016.01) | |
| *H02P 6/08* | (2016.01) | |
| *H02P 25/00* | (2006.01) | |
| *G06F 9/28* | (2006.01) | |
| *G06F 9/50* | (2006.01) | |

(52) U.S. Cl.
CPC ............ *B62D 5/0484* (2013.01); *G06F 9/28* (2013.01); *G06F 9/5027* (2013.01); *G06F 11/00* (2013.01); *H02P 6/00* (2013.01); *H02P 6/06* (2013.01); *H02P 6/08* (2013.01); *H02P 6/16* (2013.01); *H02P 6/181* (2013.01); *H02P 25/00* (2013.01); *H02P 25/26* (2013.01)

(58) Field of Classification Search
CPC ............ G06F 11/0778; G06F 11/0781; G06F 11/0784; G06F 11/0787; G06F 11/08; G06F 11/14; G06F 11/1479; G06F 11/16; G06F 11/22
USPC .......................................................... 714/48
See application file for complete search history.

(56) References Cited

U.S. PATENT DOCUMENTS

| | | | |
|---|---|---|---|
| 2003/0182593 A1* | 9/2003 | Emberty | H04L 1/22 714/5.11 |
| 2008/0147949 A1* | 6/2008 | Miyake | G06F 11/14 710/267 |
| 2010/0031091 A1* | 2/2010 | Lim | G06F 11/2284 714/40 |
| 2011/0296256 A1* | 12/2011 | Watkins | G06F 11/0724 714/54 |
| 2013/0283092 A1* | 10/2013 | Das | G06F 11/2097 714/3 |
| 2015/0241523 A1* | 8/2015 | Scherr | G01R 33/093 324/244 |
| 2015/0254140 A1* | 9/2015 | Harnik | G06F 11/1451 714/19 |
| 2015/0367887 A1 | 12/2015 | Fujita et al. | |
| 2016/0085607 A1* | 3/2016 | Marr | G06F 11/3006 714/37 |
| 2016/0126877 A1* | 5/2016 | Endoh | B62D 5/0409 318/400.02 |
| 2016/0200353 A1 | 7/2016 | Sasaki et al. | |
| 2017/0015348 A1* | 1/2017 | Sasaki | B62D 5/049 |
| 2017/0116071 A1* | 4/2017 | Arroyo | G06F 11/3027 |
| 2017/0240168 A1 | 8/2017 | Sasaki et al. | |
| 2018/0194390 A1* | 7/2018 | Goto | B62D 5/046 |

OTHER PUBLICATIONS

Communication dated May 16, 2019, from the European Patent Office in counterpart European Application No. 16903078.0.
Communication dated Jul. 3, 2020, from the China National Intellectual Property Administration in Application No. 201680085688.5.
Chinese Office Action dated Feb. 20, 2021, in Patent Application No. 201680085688.5.

\* cited by examiner

ELECTRONIC CONTROL DEVICE AND OPERATION CONTROL METHOD THEREFOR

CROSS REFERENCE TO RELATED APPLICATIONS

This application is a National Stage of International Application No. PCT/JP2016/065288 filed May 24, 2016.

TECHNICAL FIELD

The present invention relates to: an electronic control device including at least two pairs of detection means so as to have redundancy in which, when one of the pairs is abnormal, switching to detection means of the other pair is performed, as in a vehicular electric power steering device's electronic control device or the like; and an operation control method therefor.

BACKGROUND ART

As a configuration having a redundant system, a conventional electronic control device has at least two pairs of detection means, both pairs are taken in the same manner to detect abnormality, and, when an abnormality occurs, the abnormal side is not used, but only the normal side is used, and control is continued.

CITATION LIST

Patent Document

Patent Document 1: Japanese Laid-Open Patent Publication No. 9-23501
Patent Document 2: Japanese Patent No. 3679700

SUMMARY OF THE INVENTION

Problems to be Solved by the Invention

A control device disclosed in Patent Document 1 includes: three current sensors for an inverter circuit; and sensor abnormality determination means for performing determination as to normality and abnormality on the basis of currents detected by these current sensors. Control is continued by using the sensors other than an identified abnormal sensor.

In addition, a control device of Patent Document 2 includes two pairs of drive circuits. When a power feeding abnormality occurs in one of the pairs, switching to the other pair is performed and power feeding is continued.

In each of Patent Documents 1 and 2, when one of the sensors or one of the drive circuits is abnormal, the abnormality determination means performs switching to the other so that the control can be continued, and thus, redundancy is achieved in this sense.

However, in a determination method by the abnormality determination means, even when a possibility of an abnormality is detected, a plurality of times of counting and a time period are required to confirm that there is an abnormality, as described in Patent Document 1. Control during this time period is performed by using previous means having been normal. Furthermore, the determination method is a method in which abnormality detection for the two pairs is performed on the two pairs in the same manner through, for example, a software process by a CPU.

Therefore, in the conventional control devices as described above, there is a risk of occurrence of, for example, an adverse influence due to a time lag from detection of the possibility of the abnormality to switching to the other one, and increase in load on the CPU for abnormality determination.

In view of the above problems, an object of the present invention is to provide: an electronic control device that enables reduction in influence at the time of an abnormality by shortening a time lag from detection of a possibility of an abnormality to switching to the other one, and enables reduction of load on a CPU for abnormality determination; and an operation control method therefor.

Solution to the Problems

An electronic control device according to the present invention is an electronic control device including at least two pairs of detection means, and a control portion which controls a target by using information about these detection means and which includes abnormality determination means configured to perform determination as to abnormality of the detection means, the control portion being configured to continue control with a normal one of the pairs at a time of an abnormality.

The control portion executes control on one of the pairs of detection means, the abnormality determination means performs, for the execution, detection of abnormality at a normal speed and performs detection of abnormality of the other of the pairs at a speed not higher than the normal speed, and, in a case where a sign of abnormality of the detection means at the normal speed is detected, the control portion performs switching to the other normal pair and continues the control, and the abnormality determination means performs detection of abnormality of the other normal pair at the normal speed, and meanwhile, continues to perform detection of abnormality of the abnormal pair at a speed not higher than the normal speed.

Effect of the Invention

With the electronic control device according to the present invention, in a case where a sign of abnormality of the detection means is detected at the normal speed, the control portion performs switching to the other normal pair and continues the control, and the abnormality determination means performs detection of abnormality of the other normal pair at the normal speed, and meanwhile, continues to perform detection of abnormality of the abnormal pair at a speed not higher than the normal speed. Therefore, switching to the normal side can be swiftly performed by the abnormality sign detection. Furthermore, since apportionment is made between detection at the normal speed and detection at a speed not higher than the normal speed, load on a CPU can be reduced.

DESCRIPTION OF EMBODIMENTS

Embodiment 1

Hereinafter, embodiment 1 of the present invention will be described with reference to the drawings.

Figure 1:
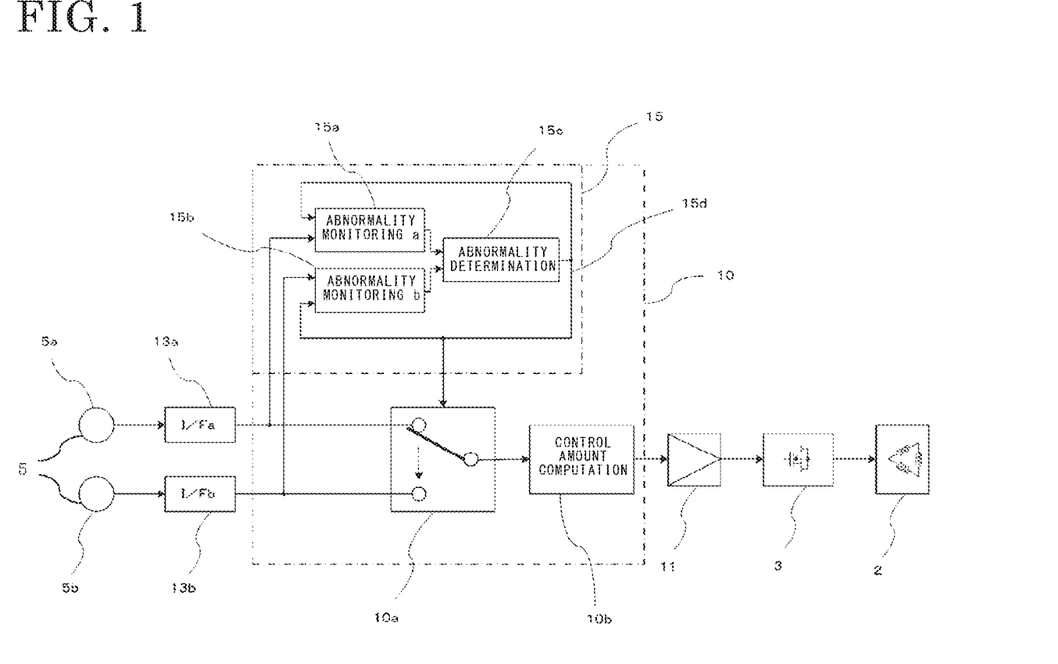
FIG. 1 is a block diagram showing an entire configuration of embodiment 1 of the present invention.

FIG. 1 is a schematic entire configuration diagram showing an electronic control device according to embodiment 1 of the present invention. The electronic control device includes sensors 5a, 5b as detection means 5, and a CPU 10 as a control portion, and the CPU 10 has abnormality determination means 15 as a function therein.

As a control command from the CPU 10, an electric signal is supplied via a first-stage drive circuit 11 from a drive portion 3 to a target portion 2 such as a motor.

The detection means 5 are two sensors 5a, 5b having substantially the same configuration and performance, and pieces of information about these sensors are inputted to respective interface circuits 13a, 13b and transmitted to the CPU 10.

The CPU 10 has therein the abnormality determination means 15, and the pieces of information about the sensors 5a, 5b are inputted also to the abnormality determination means 15.

The CPU 10 further has therein switching means 10a for selecting either one of the pieces of information about both sensors, and also has therein control amount computation means 10b for computing a control amount on the basis of the selected piece of information.

On the basis of the above configuration, operation of the CPU 10 will be described.

The pieces of information about both sensors 5a, 5b are inputted to the abnormality determination means 15, to pass through abnormality monitoring portions 15a, 15b and be inputted to an abnormality determination portion 15c.

For example, while a process is being performed on the sensor 5a at a normal speed equal to that of the control amount computation means 10b, the abnormality monitoring portion 15a is performing a process and outputting to the abnormality determination portion 15c at the equal normal speed.

Meanwhile, the abnormality monitoring portion 15b is performing a process and outputting to the abnormality determination portion 15c at a slow speed not higher than the normal speed.

In the switching means 10a, a switch is connected to the sensor 5a side so as to select the sensor 5a, but is not connected to the sensor 5b side.

Therefore, only the sensor 5a is used for the control amount computation means 10b, and control amount computation for the sensor 5b is not performed.

The abnormality determination portion 15c particularly carefully monitors and checks whether or not an abnormality is present in the piece of information about the sensor 5a inputted at the normal speed, and determines selection of a sensor to be used for control.

When an abnormality is detected in the piece of information about the sensor 5a, a signal 15d is immediately outputted to the switching means 10a, and the switch is switched in the downward direction, as indicated by an arrow in the drawing.

Substantially at the same time, the signal 15d is transmitted also to the abnormality monitoring portions 15a, 15b. Then, abnormality monitoring for the sensor 5a having been performed at the normal speed up until this moment is changed so as to be performed at a speed not higher than the normal speed, and meanwhile, abnormality monitoring for the sensor 5b having been performed at a speed not higher than the normal speed is changed so as to be performed at the normal speed.

In this case, the normal speed and a speed not higher than the normal speed each mean a cycle of information acquisition and a computing process by the CPU 10. When at the normal speed, the acquisition is performed, for example, each time in accordance with a control amount computation cycle so that new sensor information is constantly acquired. On the other hand, when at a speed not higher than the normal speed, the data acquisition is neither performed at the normal speed nor performed each time, but the acquisition is performed only once in a plurality of times of acquisition at the normal speed.

As described above, as the sensor information to be used for the control amount computation, data is acquired at the normal speed (cycle) based on the computation speed. Currently, the other sensor is not directly used for the control, and thus, acquisition is being performed at a speed (cycle) not higher than the normal speed.

In abnormality determination for the sensors 5a, 5b, both sensors are checked in a similar manner. However, since the input cycle is different therebetween, abnormality of the sensor at the normal speed can be detected earlier. Therefore, when an abnormality is detected, switching to the other sensor is swiftly performed so that the control is continued.

In addition, the abnormality determination portion 15c detects a sign of abnormality of the sensor 5a, and then, a switching signal 15d is outputted even if abnormality confirmation has not yet been determined. Therefore, there is no need to wait until abnormality determination confirmation, and the sensors are switched with only a sign of abnormality, and thus, the continuity of the control can be ensured.

Furthermore, since abnormality checking is performed on both sensors while being performed on one of the sensors at the normal speed and on the other sensor at a speed not higher than the normal speed, process load on the CPU can be reduced as compared with a case where the process is performed on both sensors at the normal speed.

Next, a specific device and a circuit thereof will be described in detail.

Figure 2:
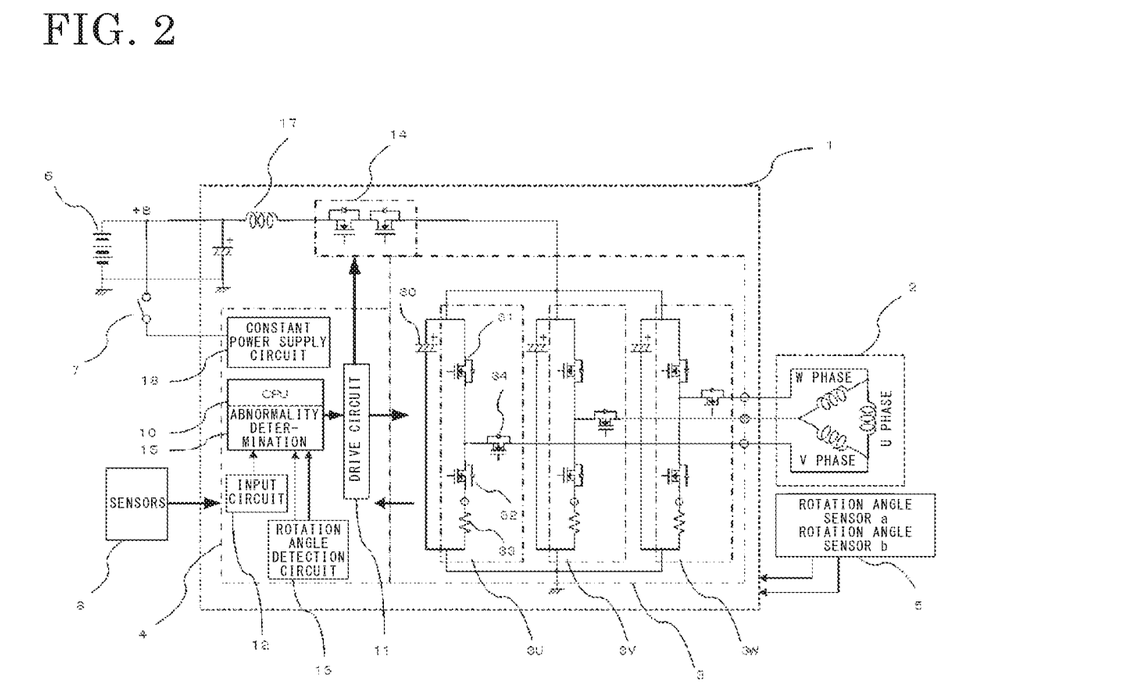
FIG. 2 is a schematic circuit diagram showing the entire configuration of embodiment 1 of the present invention.

FIG. 2 is a diagram of an entire circuit which is obtained by applying the present invention as an electronic control device for a vehicular electric power steering device and which includes a motor 2 and a control unit portion 1.

Here, the motor 2 is a three-phase brushless motor. For the brushless motor 2, rotation angle sensors 5 for detecting the rotation angle of the motor are disposed near an output shaft of the motor.

Outside the control unit portion 1, a battery 6 mounted in the vehicle, an ignition switch 7, and sensors 8 such as a vehicle speed sensor and a torque sensor for detecting the steering torque of a steering wheel, are disposed.

Inside the control unit portion 1, a so-called inverter circuit 3 in which switching elements for supplying current to the motor 2 are connected to respective phases, is disposed. A control board 4 includes: a constant power supply circuit 18; various input circuits 12; the CPU 10; the drive circuit 11; a rotation angle detection circuit 13 for the rotation angle sensors 5; and the like. Besides the above, a filter 17, power-supply switching elements 14 serving as power supply relays, and the like also exist.

The outline of operations of the above components in the control unit portion 1 is as follows. When the ignition switch 7 is turned on by a driver, constant voltage is supplied by the constant power supply circuit 18 to the CPU 10, the input circuits 12, the drive circuit 11, the rotation angle detection circuit 13, and the like.

Power for the inverter circuit 3 is supplied from the battery 6 via the filter 17. Pieces of information from the sensors 8 such as the vehicle speed sensor and the torque sensor are transmitted via the input circuits 12 to the CPU 10, and a control amount according to which power is to be supplied to the motor 2 is computed by the CPU 10 on the basis of these pieces of information, and then outputted via the drive circuit 11 as an output.

The voltage or the current of each component in the inverter circuit 3 is detected and transmitted via the input circuits 12 to the CPU 10. The power-supply switching elements 14 having a relay function to perform opening and closing is provided in a power supply line.

The switching elements 14 are FETs, for example, and, as parasitic diodes, elements in a forward direction and an opposite direction relative to current supply are disposed in series. By the switching elements, supply of power can be forcibly interrupted when, for example, a failure occurs in the inverter circuit 3 or the motor 2. Also drive of the switching elements 14 is controlled via the drive circuit 11 by the CPU 10.

For a three-phase winding (U phase, V phase, W phase) of the motor 2, the inverter circuit 3 has arm circuits 3U, 3V, 3W, for the respective phases, which are each composed of switching elements 31, 32, a shunt resistor 33, a capacitor 30, and the like which are the same among the arm circuits 3U, 3V, 3W. Each arm circuit includes: two switching elements 31, 32 constituting upper and lower arms and disposed in series; and a motor-relay switching element 34 having a relay function to perform opening and closing between the motor winding and the switching elements.

PWM drive is performed on the switching elements 31, 32 for the upper and lower arms on the basis of a command from the CPU 10, and thus, also the capacitor 30 is connected nearby for the purpose of noise suppression. Also the shunt resistor 33 is connected in order to detect current flowing through the motor 2. A voltage at a location between the switching elements 31, 32 for the upper and lower arms or a voltage at a motor winding (U phase, V phase, W phase) terminal, and a voltage at the shunt resistor 33 are transmitted to the CPU 10, and the difference between a control command value (target value) from the CPU 10 and each of the actual current/voltage values is obtained to perform so-called feedback control, and determination as to failure of each component is also performed.

A rotation angle is detected by the rotation angle sensors 5, and the rotational position or the speed of the motor is calculated by the CPU 10 and is used for a timing of coil current supply.

Here, as the rotation angle sensors 5, the two sensors a, b having the same structure and performance are disposed in order to increase redundancy. Signals detected by the rotation angle sensors a, b are transmitted to the rotation angle detection circuit 13 and each converted to such a voltage level that input to the CPU 10 is enabled, and the resultant signals obtained by the conversion are outputted.

The sensors 5a, 5b in FIG. 1 correspond to the rotation angle sensors a, b in FIG. 2. Also regarding the other parts in FIG. 1, parts corresponding thereto in FIG. 2 are denoted by the same reference characters. The description of the rotation angle sensors a, b and the rotation angle detection circuit will be continued.

In order to detect the rotation angle of the output shaft of the motor 2, the rotation angle sensors a, b may be of, for example: a resolver type for detecting a change in a magnetic field occurring in accordance with rotation of the output shaft; or a magnetic resistance (MR) element type.

Figure 3:
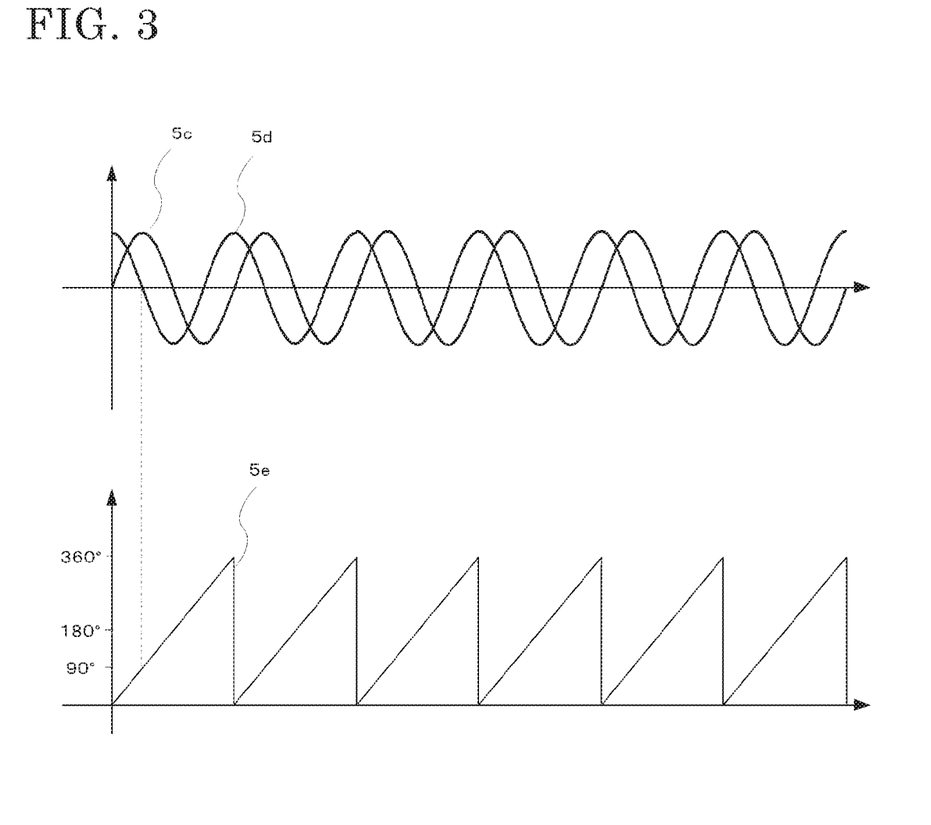
FIG. 3 is a waveform diagrams showing signal waveforms from a rotation angle sensor in embodiment 1 of the present invention.

Waveforms detected by each of the rotation angle sensors a, b are two types of signals, i.e., a sin signal and a cos signal 5d along the time axis as shown in FIG. 3.

A total of four of these signals are inputted to the rotation angle detection circuit 13 and each converted to such a voltage waveform as to be capable of being acquired through an A/D input port of the CPU 10, and the resultant signals obtained by the conversion are outputted.

Also the rotation angle detection circuit 13 has a dual-circuit configuration having interface circuits 13a, 13b as shown in FIG. 1.

With respect to the rotation angle sensors a, b and the rotation angle detection circuit 13, although all of the four signals thereof are inputted to the CPU 10 in a case where being normal, the results of both of them are the same if the signals are normal, and thus, it is not necessary to constantly detect and acquire two pairs of signals at the same time.

Therefore, only one of the pairs is acquired at the normal speed, and the other pair is acquired at a speed not higher than the normal speed, e.g., ¹⁄₁₀ of the normal speed. Here, as a signal to be detected by the rotation angle sensor 5, a signal corresponding to 360°, i.e., one cycle can be detected with one rotation of the output shaft of the motor 2, as indicated by a waveform 5e in FIG. 3.

Once the amplitudes of the sin signal 5c and the cos signal 5d from the rotation angle sensor 5 are acquired, an angle can be easily calculated from the amplitudes, and the CPU 10 outputs a control amount command in accordance with the angle.

Next, rotation angle detection by the CPU 10 and the functions of the abnormality determination means 15 will be described with reference to FIG. 3 to FIG. 5.

The rotation angle sensor 5 is for detecting the rotation angle of the output shaft of the motor 2, and the accuracy thereof greatly influences the control, and thus, the rotation angle has to be detected at a higher speed (shorter control computation cycle) so as to be used for a timing of supply of power to the motor 2.

Therefore, processes of rotation angle computation and abnormality determination are performed in an interruption routine different from a main routine in software of the CPU 10. Flowcharts of the processes are shown in FIG. 4 and FIG. 5.

Figure 4:
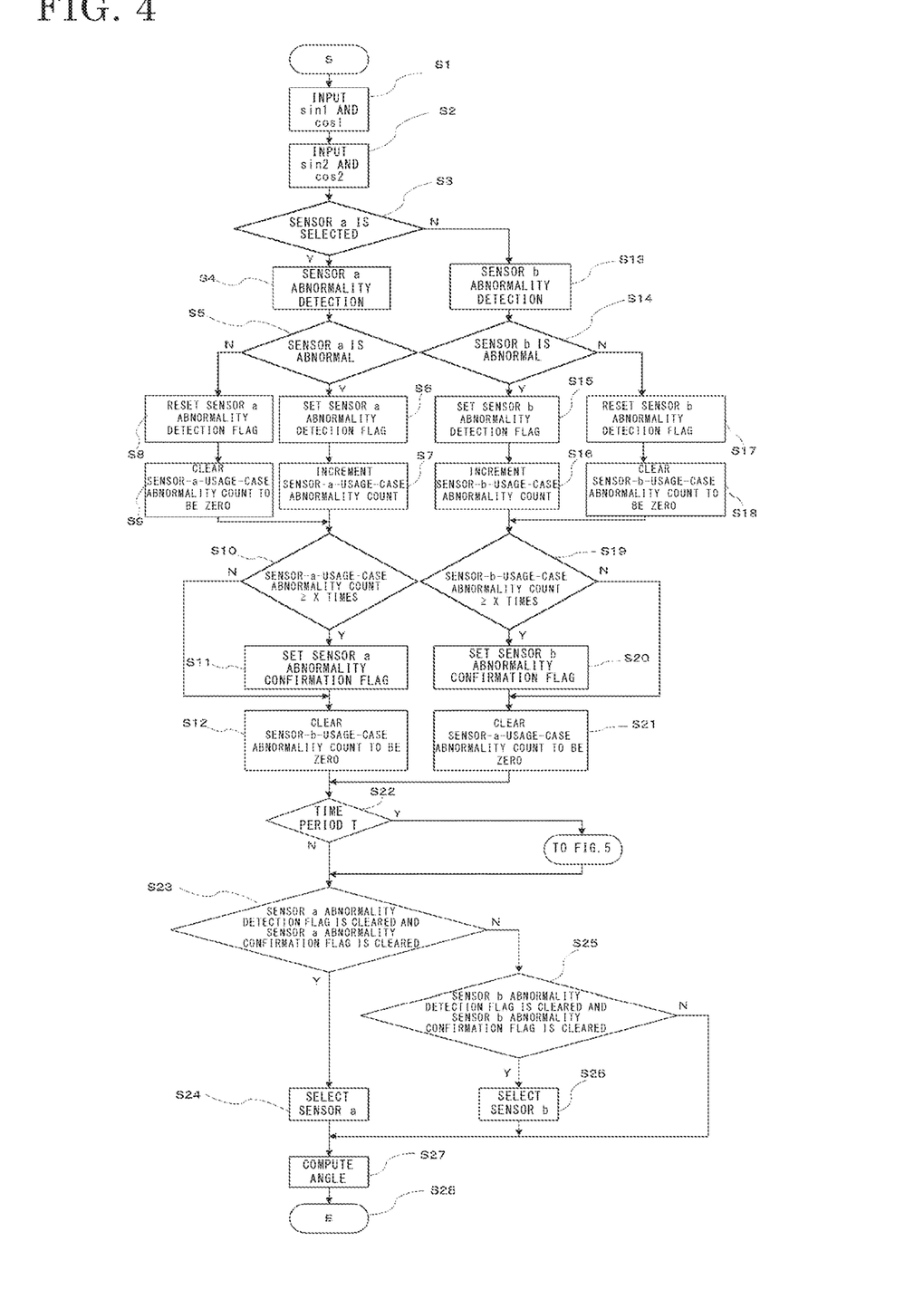
FIG. 4 is a flowchart showing a process by an abnormality determination means, in embodiment 1 of the present invention.

The process in the flowchart in FIG. 4 is started with interruption in an interruption cycle, e.g., once in a time period of 100 μsec.

First, in step S1, the sin signal (5c in FIG. 3) and the cos signal (5d in FIG. 3) from the rotation angle sensor a are inputted and the data are stored. Similarly, in step 2, the sin and cos signals from the rotation angle sensor b are inputted and the data are stored.

Next, in step 3, a rotation angle sensor selection state is checked. Since there are two rotation angle sensors, determination is performed as to which of the sensors is selected for the normal speed for the control.

If the rotation angle sensor a is selected (YES), the abnormality detection process is performed on the rotation angle sensor a. If the rotation angle sensor a is not selected (NO), the abnormality detection process is performed on the rotation angle sensor b. Since the rotation angle sensors a, b have substantially the same function and performance, also the processes therefor are the same. Therefore, the descriptions of the processes will be collectively continued.

If the rotation angle sensor a is selected (YES), sensor a abnormality detection is performed in step S4 in order to check whether or not the inputted waveforms (voltages) from the sensor a are normal.

On the other hand, if the rotation angle sensor a is not selected (NO), sensor b abnormality detection is performed in step S13 in order to check whether or not the inputted waveforms (voltages) from the sensor b are normal.

As a method for the abnormality detection, there is a method performed through detection of a voltage (amplitude) outside a predetermined range. Each sensor waveform is transmitted to the A/D input port of the CPU 10. Thus, if the amplification factor for the rotation angle detection circuit 13 is set such that, for example, the amplitude changes between 1 V and 4 V, it can be determined that there is an abnormality in a case where the voltage is fixed at 0 V or 5 V.

Alternatively, in a case where rotation control is performed on the motor 2, if the acquired values are unchanged from previously acquired values or if only one of the values is changed and the other value is unchanged, the unchanged signal(s) can be determined to be abnormal. That is, an abnormality can be detected on the basis of the change from the previous values.

Next, in step S5, whether or not an abnormality has occurred is checked. If the rotation angle sensor a is abnormal (YES), a sensor a abnormality detection flag is set in step S6. The abnormality detection flag is used for a sensor selection process described later.

Then, in step S7, since the rotation angle sensor a has been determined to be abnormal, a sensor-a-usage-case abnormality count is incremented.

In step S8, since the sensor a is not abnormal, the sensor a abnormality detection flag is reset, and, in step 9, the sensor-a-usage-case abnormality count is cleared to be 0. Similarly, for the rotation angle sensor b, a sensor b abnormality flag is set or reset and a sensor-b-usage-case abnormality count counting process is performed in steps S14 to S18.

Next, an abnormality confirmation process is performed on the selected sensor in steps S10 to S12 or S19 to S21.

In S10, whether or not the sensor-a-usage-case abnormality count is equal to or more than a predetermined count (X times) is checked. If the abnormality count is equal to or more than the predetermined count (YES), a sensor a abnormality confirmation flag is set in step S11.

The abnormality confirmation flag is set when a sensor is determined to be definitely abnormal, and means that the sensor cannot be used for control any more. Here, the predetermined count (X times) is set within such a range that there is no problem in terms of safety even if the control is continued with an abnormal sensor input signal.

Next, in step 12, the abnormality count at the time of usage of the unselected sensor b is cleared to be 0. Similarly, for the rotation angle sensor b, the sensor b abnormality confirmation flag is set and the sensor-a-usage-case abnormality count is cleared to be 0 in steps S19 to S21.

Next, in step S22, whether or not a timing for a cyclic process in a cycle equal to or longer than the normal cycle has arrived is checked. If the timing for the cycle equal to or longer than the normal cycle has arrived (YES), a process in FIG. 5 described later is executed. The cyclic process in a cycle equal to or longer than the normal cycle means a process that is executed in the normal cycle or a cycle longer than the normal cycle.

Next, in steps S23 to S26, a selection process for a sensor to be used for the control is performed. In S23, as the determination results obtained by the above abnormality determination processes, set/cleared states of the sensor a abnormality detection flag and the sensor a abnormality confirmation flag are checked, and, if both flags are cleared (YES), the sensor a is selected in step S24. In a case other than the above (NO), set/cleared states of the sensor b abnormality detection flag and the sensor b abnormal confirmation flag are checked in step S25, and, if both flags are cleared (YES), the sensor b is selected in step S26. In a case other than the above (NO), switching between the sensors is not performed.

That is, in a case of a primary failure, switching to the other sensor is instantaneously performed so that behavior at the time of the abnormality is inhibited, and, in a case of a secondary failure in which the other sensor is already abnormal, the control is continued with the sensor that is used for the control.

Next, in step S27, a rotation angle is computed with arctan by using the sin and cos voltage signals acquired from the selected sensor (5e in FIG. 3).

The steps described above are the abnormality detection and switching processes for the rotation angle sensor 5, and thereafter, a process for ending the interruption routine is performed in step S28, thereby ending the interruption routine.

Next, the process in the normal cycle or a cycle longer than the normal cycle will be described with reference to FIG. 5.

In step S22 in FIG. 4, whether or not a time period T or a predetermined number of times has elapsed is checked. The process in FIG. 4 is repeated once in 100 μsec, for example. Therefore, detection and acquisition are performed on the rotation angle sensor in the normal cycle. However, the process in FIG. 5 corresponds to a process at a speed (cycle) not higher than the normal speed.

The process in FIG. 4 is performed if the time period T has not elapsed (NO), and the following process is executed if the time period T, e.g., 1 msec has elapsed (YES).

In the process at a speed (cycle) not higher than the normal speed, abnormality determination and normality determination are performed on the sensor that is not selected for the control. In step S30, a sensor selection state is determined.

If the rotation angle sensor a is not selected (NO), the sensor a abnormality detection for checking whether or not the sensor a is normal is performed in step S31. Similarly, if the rotation angle sensor a is selected (YES), the sensor b abnormality detection is performed in step S40. Steps 31 to 39 and steps 40 to 48 are abnormality determination processes similar to those in steps S4 to S12 and steps S13 to S21 in FIG. 4, but are different in terms of abnormality confirmation process after an abnormality is detected.

This step is executed only once in 10 times of FIG. 4. Furthermore, in FIG. 4, the abnormality confirmation is performed with a time period that is set within such a range that there is no problem in terms of safety even if the control is continued with an abnormal sensor input signal, whereas, in FIG. 5, the abnormality confirmation is performed on the unselected sensor, and thus, determination as to the abnormality confirmation is performed over a longer time period at a speed not higher than the normal speed as compared with the case in FIG. 4.

Figure 5:
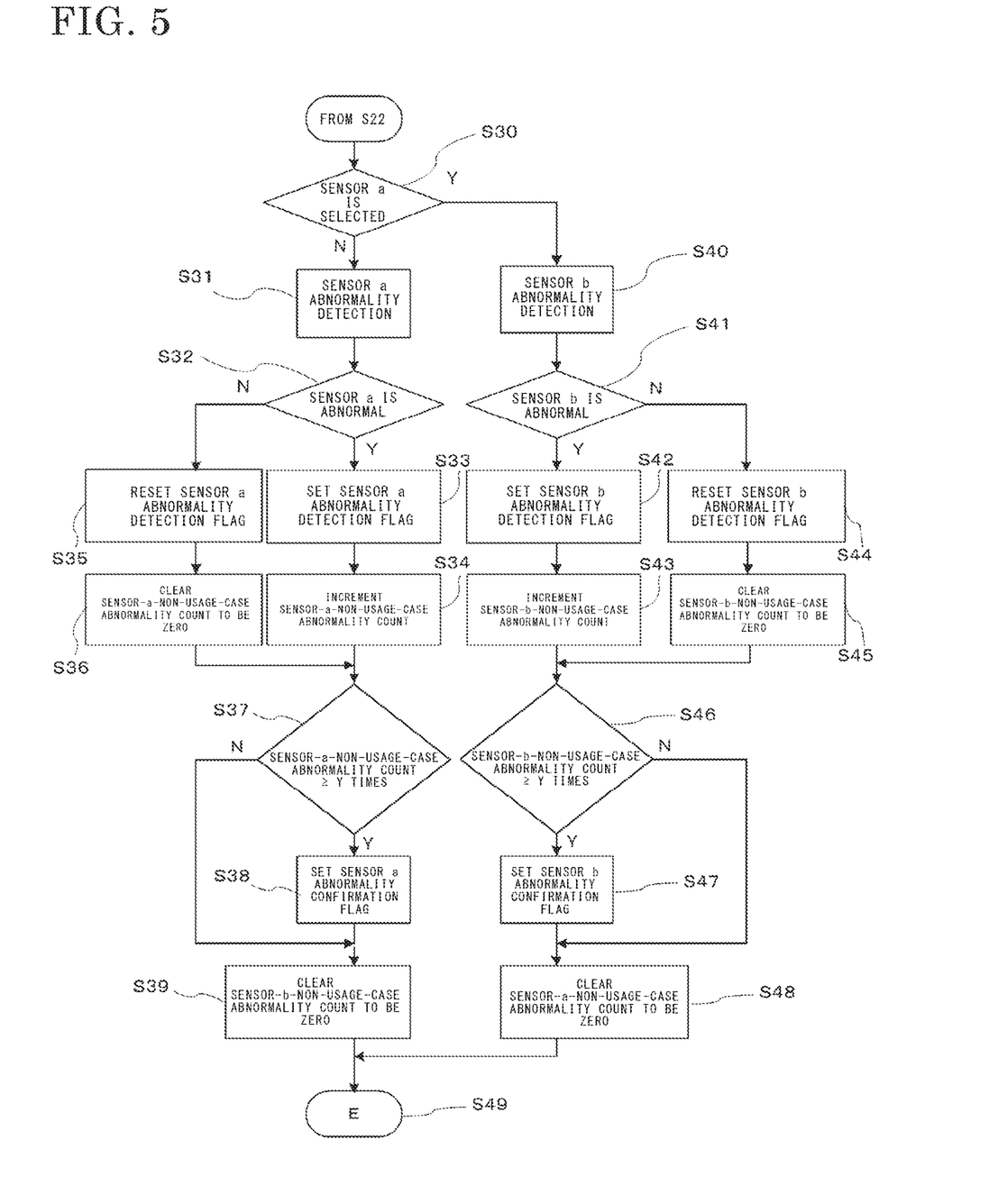
FIG. 5 is a major part flowchart showing a process by the abnormality determination means, in embodiment 1 of the present invention.

Therefore, in FIG. 5, a sensor-non-usage-case abnormality count counter is provided as a counter separate from the sensor-usage-case abnormality count counter in FIG. 4 in order to perform determination as to the failure confirmation. For example, in a case where the sensor-usage-case abnormality confirmation count X in FIG. 4 10 times and a sensor-non-usage-case abnormality confirmation count Y in FIG. 5 is 10 times, an abnormality confirmation time period in FIG. 4 is 100 μsec*10 times=1 msec and an abnormality confirmation count in FIG. 5 is 1 msec*10 times=10 msec.

The steps described above are the process by the abnormality determination means 15 of the CPU 10, and the CPU 10's switching means and rotation angle sensor information acquisition and selection processes.

As described above, in the process by the CPU 10, information about one of the sensors is acquired at the normal speed (cycle), and processes of the abnormality detection and switching for control amount usage are performed, whereby, even though two sensors are used, the load for the software processes does not double, and the time period for the entire process can be shortened.

Furthermore, as the abnormality determination, an instantaneous determination result is used for the switching between the normal and abnormal sensors, and determination as to the abnormality confirmation is accurately performed over a predetermined time period, and thus, a time period with instability for the control from abnormality sign detection to the abnormality confirmation can be shortened, whereby the continuity of the control can be ensured.

In the above description, the switching process is performed when abnormality data is acquired only once as a sign of abnormality.

However, a slightly longer time margin is sometimes left depending on the target (rotation of the motor 2) and the detection object (rotation angle sensor).

Regarding the target and the detection object in embodiment 1, such a period that, as a result of an interruption of continuity of the rotation control for the motor 2, a driver does not notice the interruption, or, irrespective of a driver, steering performance is not affected and noise or vibration does not occur, is acceptable.

On the other hand, judging from the rotary surface of the motor, current is applied in the d axis with a phase difference of 90° at the time of current application in the q axis, in dq axis control used for motor torque control. As a result, a field magnetic flux is changed, and acts so as to suppress motor rotation.

At the phase difference of 90°, the torque theoretically becomes zero. Therefore, a numeric value smaller than the phase difference of 90° can be selected as a threshold value.

In a case where the motor maximum rotation rate of the electric power steering device is set to, for example, 5000 rpm and an abnormality is to be detected by the time when a movement by less than 90° is made, the following relationship is satisfied.

5000 rpm→12 msec/rotation→3 msec/90°

Thus, an abnormality needs to be detected within a time period shorter than 3 msec.

Therefore, in a case where the CPU 10 acquires an abnormal voltage, even if it is to be determined that there is a sign of abnormality when the abnormal voltage is detected continuously over 10 times of the 100-μsec routine, the time period is as follows.

100 μsec*10 times=1 msec

Thus, an abnormality can be sufficiently detected with such a rotation rate that there is no problem in practical use as a normal electric power steering device's motor rotation rate.

Therefore, in the interruption routine in FIG. 4, checking for abnormality does not need to be performed each time, but may be performed once for each two times.

100 μsec*2*10 times=2 msec

Checking by a plurality of times (10 times) of the abnormality detection can be performed, and reduction of the number of times of the abnormality determination process and inhibition of erroneous detection due to noise can be performed, whereby software process load on the CPU 10 can be reduced.

As described above, the present invention is an electronic control device including at least two pairs of detection means, and a control portion which controls a target by using information about these detection means and which includes abnormality determination means configured to perform determination as to abnormality of the detection means, the control portion being configured to continue control with a normal one of the pairs at a time of an abnormality.

The control portion executes control on one of the pairs of detection means, the abnormality determination means performs, for the execution, detection of abnormality at a normal speed and performs detection of abnormality of the other of the pairs at a speed not higher than the normal speed, and, in a case where a sign of abnormality of the detection means at the normal speed is detected, the control portion performs switching to the other normal pair and continues the control, and the abnormality determination means performs detection of abnormality of the other normal pair at the normal speed, and meanwhile, continues to perform detection of abnormality of the abnormal pair at a speed not higher than the normal speed.

In addition, the present invention is an operation control method for an electronic control device including detection means including at least two pairs of sensors, and a control portion which controls a target by using information about these detection means and which includes abnormality determination means configured to perform determination as to abnormality of the detection means, the control portion being configured to continue control with a normal one of the pairs at a time of an abnormality, the abnormality determination means being included in a CPU, the operation control method including:

a first step of performing abnormality detection on detection means A of a selected one of the two pairs of detection means at a normal speed corresponding to a control amount computation cycle of the control portion;

a second step of confirming that the detection means A is abnormal, if an abnormality count of the detection means A is equal to or more than a predetermined count;

a third step of performing abnormality detection on detection means B of the other of the pairs at a speed not higher than the normal speed;

a fourth step of confirming that the detection means B is abnormal, if an abnormality count of the detection means B is equal to or more than the predetermined count; and a fifth step of switching the detection means to be used for the control from the detection means A to the detection means B if abnormality of the detection means A being used for the control is detected or confirmed and if abnormality of the detection means B of the other pair is neither detected nor confirmed, on the basis of determination results of the abnormality detection and the abnormality confirmation in the first step to the fourth step.

Since the electronic control device and the operation control method therefor according to the present invention are configured as described above, the following effects are exhibited:

immediately after a sign of abnormality is detected at the normal speed (cycle), switching to the normal-side detection means is performed and the control is continued, and meanwhile, detection for the abnormal side at least continues to be checked at a speed (cycle) not higher than the normal speed, and in a case where an abnormality continues to be detected, it is determined that the abnormality is confirmed, whereby a quicker response to the abnormality can be performed and continuity of the control can be ensured, and furthermore, since the detection continues to be performed at a speed (cycle) not higher than the normal speed until the abnormality is confirmed, load on the CPU can be reduced.

Besides the rotation angle sensors, the present invention is similarly applicable to, for example, a torque sensor and a voltage/current detection circuit.

Embodiment 2

Next, embodiment 2 will be described.

Embodiment 1 employs the following configuration: when abnormality of the sensor a is detected in an interruption routine in the normal cycle (FIG. 4), selection is switched to the normal-side sensor, and then, the state of the abnormal-side sensor is checked in the process in the normal cycle or a cycle longer than the normal cycle (FIG. 5), and, when the sensor is determined to be normal, the process of resetting the abnormality detection is executed in step S35 and selection is switched to the sensor a again.

Here, in a situation where abnormality of the sensor is detected owing to transient noise mixing, the abnormality is not confirmed but the sensor is determined to be normal, and thus, sensor switching is frequently performed. Therefore, once switching to a sensor is performed, the sensor is used for some time, thereby preventing the frequent switching.

Figure 6:
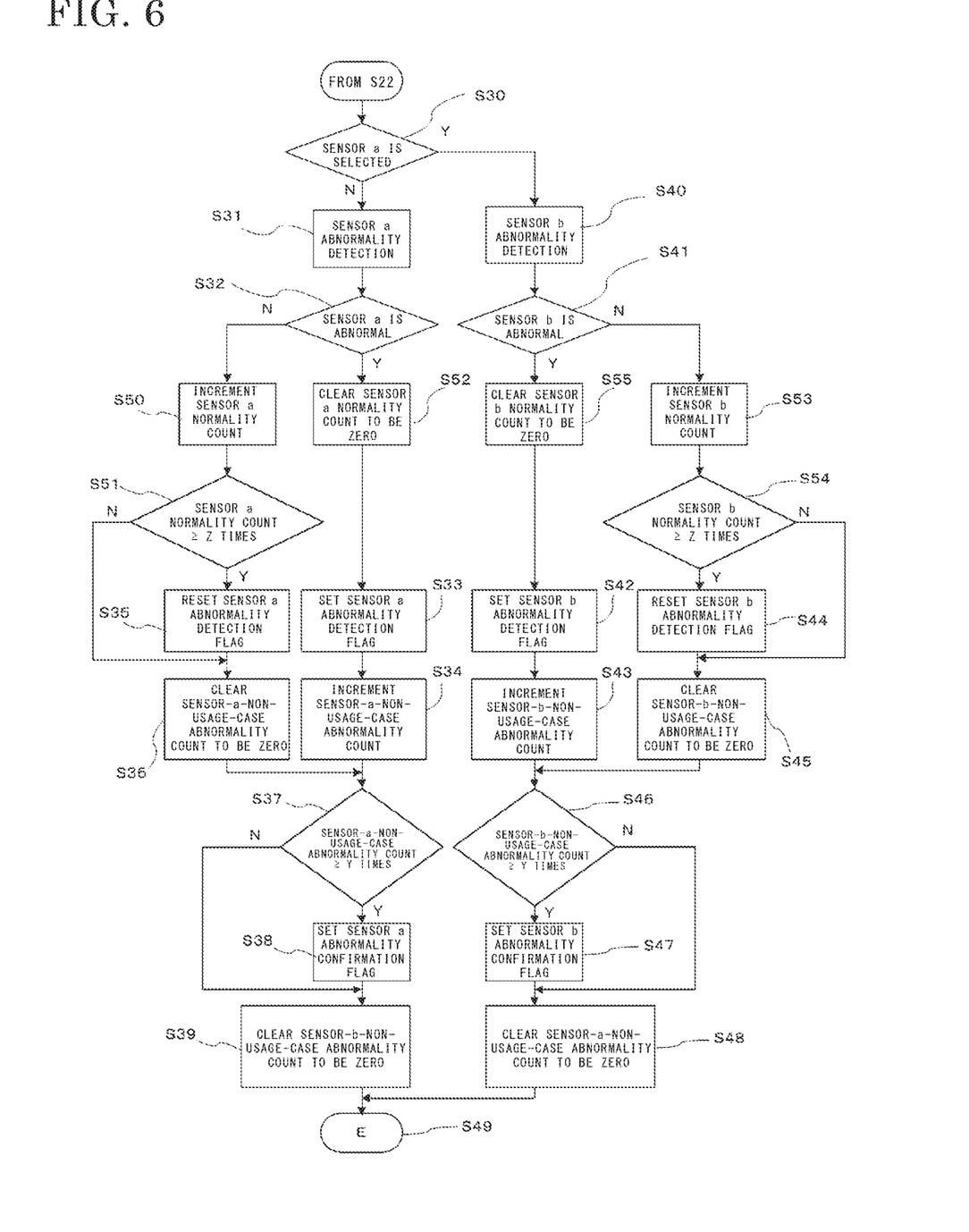
FIG. 6 is a major part flowchart showing a process by the abnormality determination means, in embodiment 2 of the present invention.

A flowchart in FIG. 6 is obtained by partially modifying FIG. 5, and the same processing steps are denoted by the same reference characters.

In the process in the normal cycle or a cycle longer than the normal cycle, whether or not the sensor a is selected is checked in step S30. If the sensor a is not selected (NO), the abnormality detection is performed on the sensor a in step S31, and whether or not the sensor a is abnormal is checked in step S32.

If the sensor a is not abnormal (NO), a sensor a normality count is incremented in step S50. If the sensor a normality count continues to increase to Z times in step 51 (YES), the sensor a abnormality detection flag is reset in step S35.

On the other hand, if the sensor a is abnormal in step S32 (YES), the sensor a normality count is cleared to be 0 in step S52.

Also for the sensor b, the resetting determination process for the sensor b abnormality detection flag is similarly performed in steps S53 to S54 or S55. The other steps are the same processes as those in FIG. 6, and thus, the description thereof is omitted.

As described above, once switching between the sensors a, b is performed in the normal cycle, the switching is reset after checking of the normal state for a certain period in the normal cycle or a cycle longer than the normal cycle. Therefore, for example, even if first switching is executed once in each 100 μsec, next switching occurs after the Z times in the normal cycle or a cycle longer than the normal cycle, and, if Z is 5, switching occurs at an interval of 5 msec at the shortest.

In this manner, by incorporating a timer function into the abnormality resetting function for the routine in the normal cycle or a cycle longer than the normal cycle, a system in which switching does not frequently occur can be easily realized.

Embodiment 3

Next, embodiment 3 will be described with reference to FIG. 7.

Figure 7:
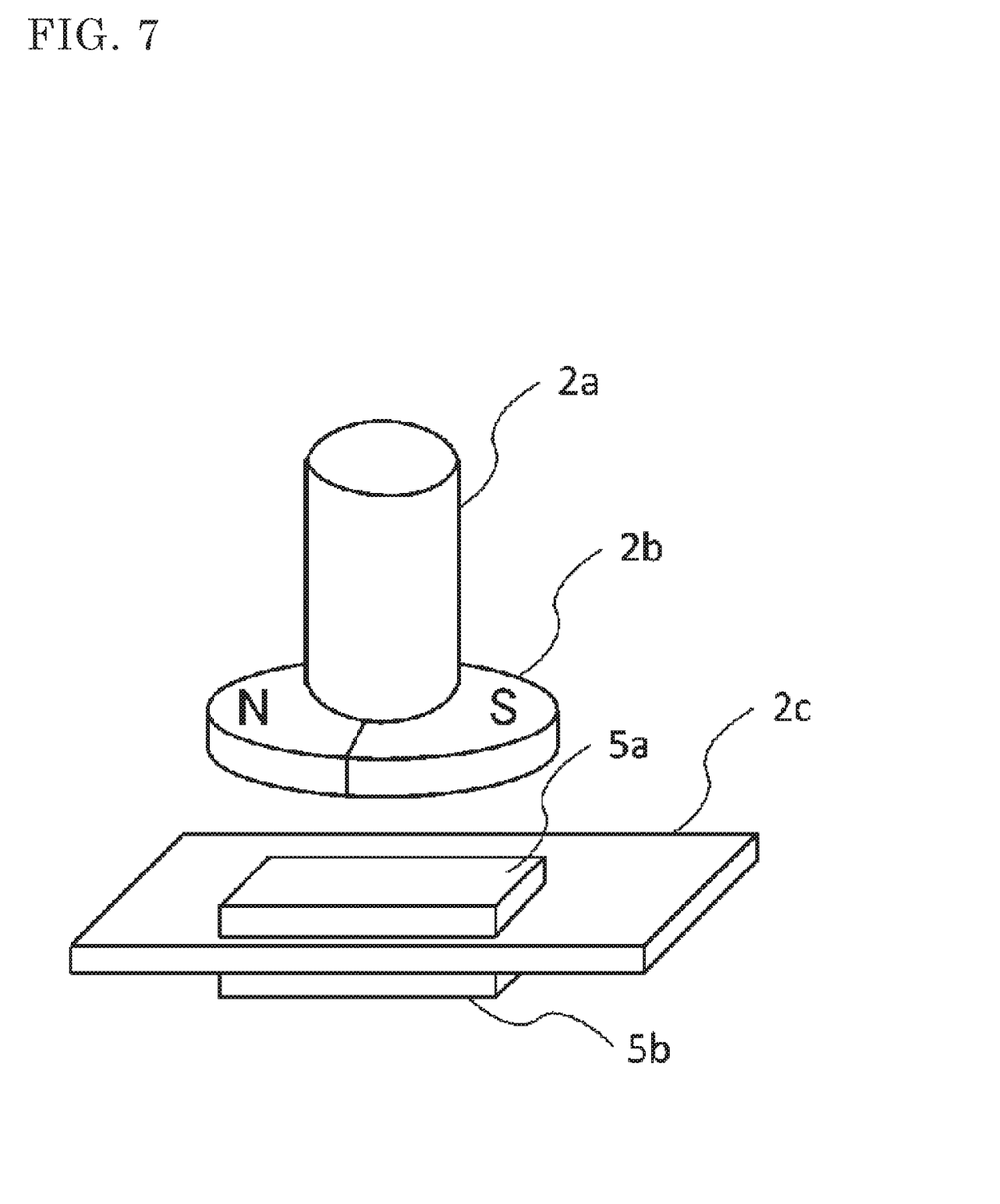
FIG. 7 is a perspective view showing one example of the rotation angle sensor in embodiment 3 of the present invention.

FIG. 7 shows the structures of portions corresponding to the motor, the rotation angle sensor a, and the rotation angle sensor b in FIG. 2 in embodiment 1, and is an explanatory view in a case where a magnetic resistance (MR) sensor for detecting the rotation angle of a motor on the basis of a change in a resistance occurring in accordance with the magnetic field direction is used as the rotation angle sensor.

In FIG. 7, 2a represents a shaft of the motor 2, 2b represents a magnet attached such that the magnetic field direction changes when the rotation angle of the motor 2 changes, and 2c represents a substrate equipped with the rotation angle sensors 5a and 5b of which the internal resistances change owing to a change in the magnetic field direction so that an angle signal is outputted in accordance with the change in each resistance.

Here, in a case where two pairs of rotation angle sensors are attached, the rotation angle sensors need to be mounted on an extension line of the shaft axis in order to measure the magnetic field direction that changes owing to rotation of the shaft 2a. For example, the rotation angle sensors are mounted on both sides of the substrate 2c as shown in FIG. 7.

Generally, the intensity of a magnetic field decreases in accordance with a distance, and thus, even when identical sensors are used as the rotation angle sensor 5a and the rotation angle sensor 5b, the rotation angle sensor 5a at a shorter distance from the magnet is considered to have a higher accuracy of angle detection.

On the other hand, as described in embodiment 1, if neither the rotation angle sensor 5a nor the rotation angle sensor 5b exceeds a threshold value, i.e., 90°, it is determined that there is no abnormality, and switching to the motor rotation angle based on the originally used sensor signal is performed. At this time, if the deviation in rotation angle is large, motor current of each phase computed in accordance with the angle rapidly changes, and thus, torque variation occurs.

Therefore, by performing determination of switching when the deviation between the rotation angle sensor $5a$ and the rotation angle sensor $5b$ is sufficiently small, switching to a sensor having high detection accuracy can be performed, with torque variation being small when sensor switching is performed at the time of restoration.

Figure 8:
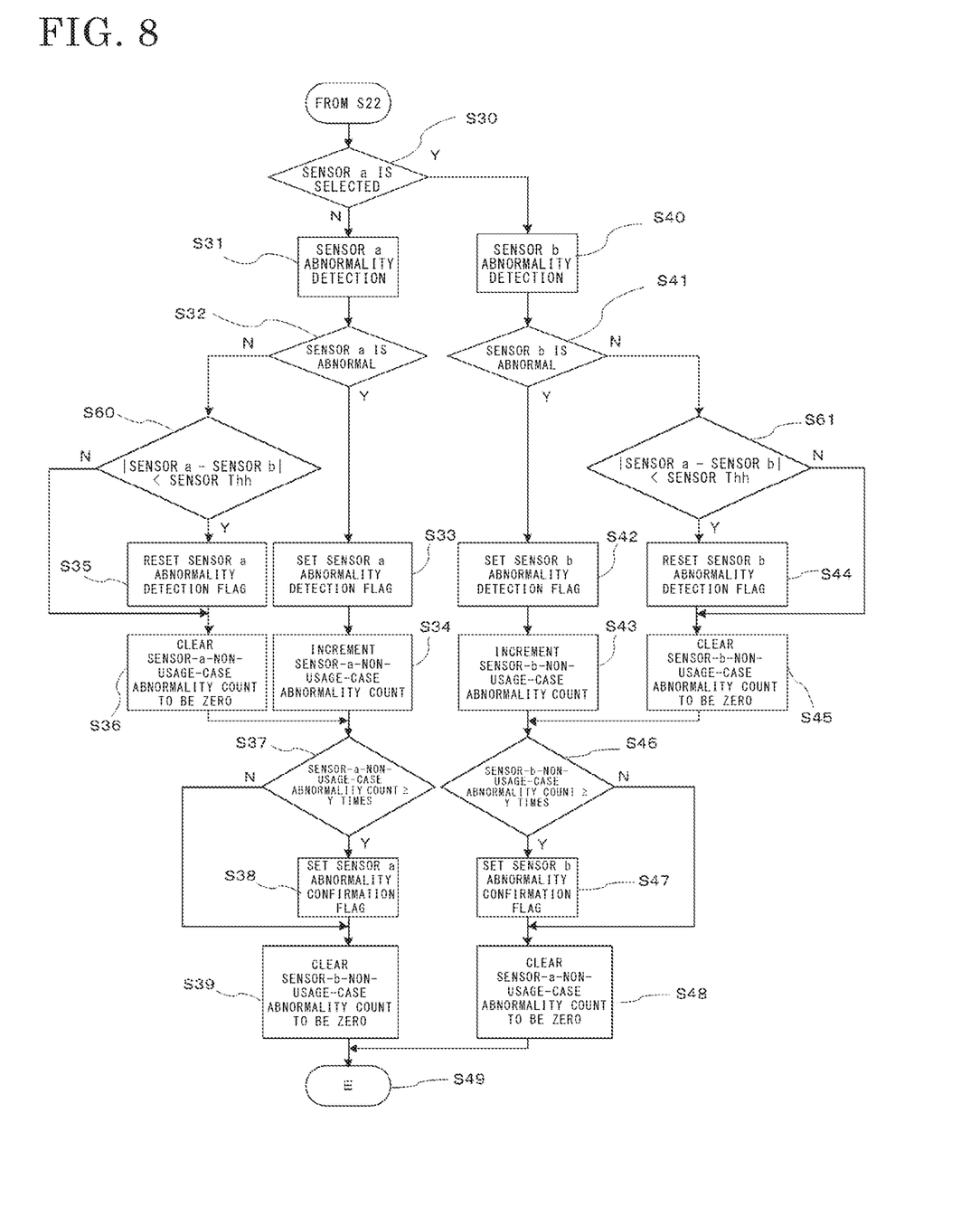
FIG. 8 is a major part flowchart showing a process by the abnormality determination means, in embodiment 3 of the present invention.

Next, the present embodiment 3 will be described with reference to a flowchart. The flowchart in FIG. 8 is obtained by partially modifying the flowchart in FIG. 6. The same processing steps are denoted by the same reference characters, and thus, the same description thereof is omitted.

In step S32, if the sensor a is determined to be not abnormal (NO), the process proceeds to step S60 in which whether or not the deviation between the sensor a and the sensor b is equal to or smaller than a predetermined value is determined.

If the deviation is determined to be equal to or smaller than the predetermined value (YES), it is determined that torque variation is to be sufficiently small at the time of change even when switching between the rotation angle sensor signals is performed. Then, the sensor a abnormality detection flag is reset in step S35, and the rotation angle sensor signal is switched to that of the originally used rotation and sensor $5a$.

Similarly, also for the sensor b, the process of resetting the sensor b abnormality detection flag is performed in steps S61, S44.

On the other hand, if the deviation between the sensor a and the sensor b is equal to or larger than the predetermined value in step S60 (NO), it is determined that torque variation is to be large when switching between the sensor signals is performed, and the process directly proceeds to step S36.

The same determination process is performed also on the sensor b in step S61. The subsequent steps are completely the same as those in embodiment 1, and thus, the description thereof is omitted.

As described above, even in the case where two pairs of detection means are provided and one of the pairs of detection means has higher accuracy, immediately after a sign of abnormality is detected at the normal speed (cycle), switching to the normal-side detection means is performed and the control is continued, and meanwhile, the abnormal-side sensor at least continues to be monitored at a speed (cycle) not higher than the normal speed, and, if the sensor is determined to be not abnormal and if the deviation in sensor signal between the two pairs does not exceed the predetermined value, switching to the originally used sensor signal is performed, whereby the torque variation of the motor can be sufficiently reduced and control can be performed with high detection accuracy.

Embodiment 4

Figure 9:
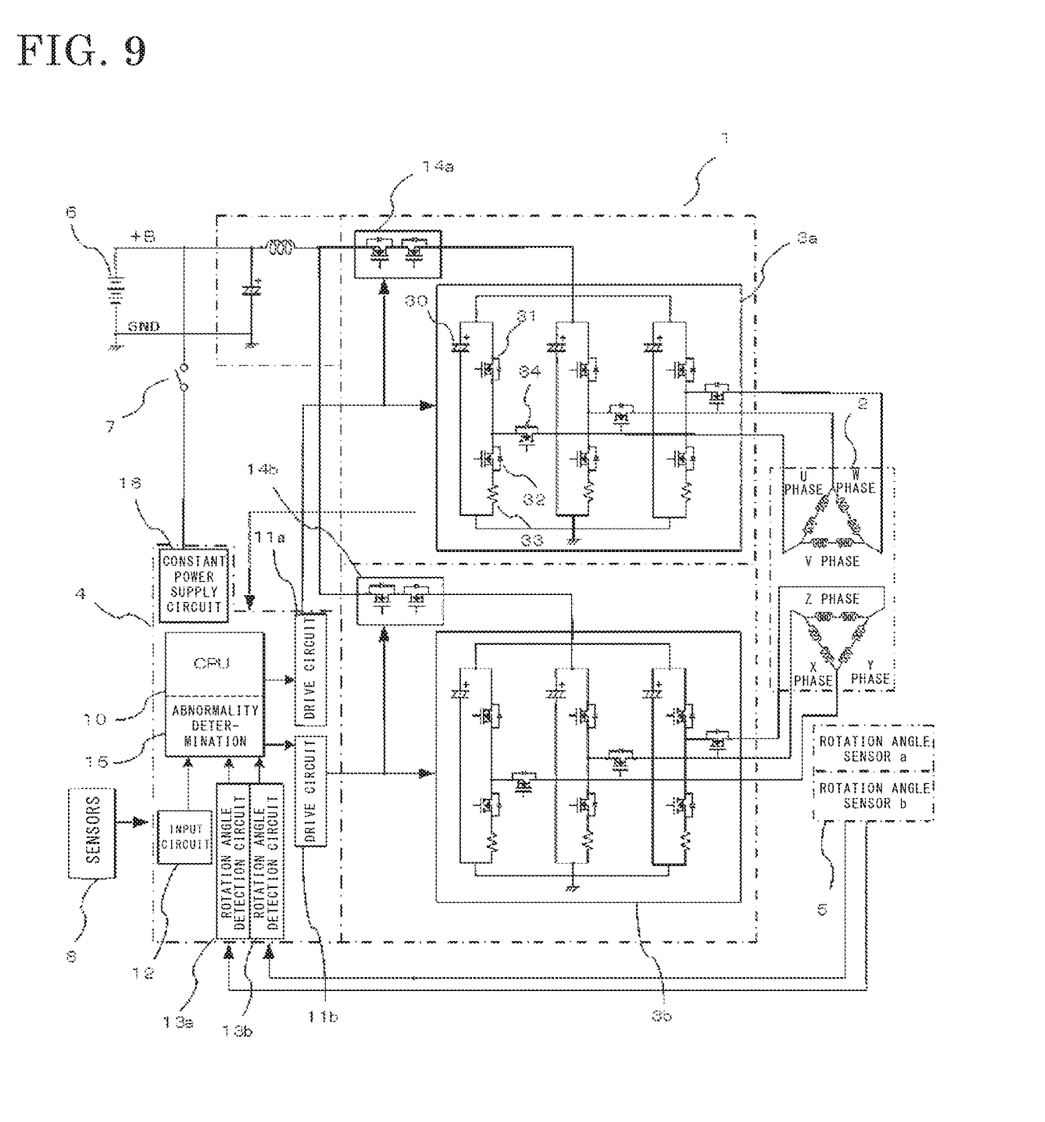
FIG. 9 is a schematic circuit diagram showing an entire configuration of embodiment 4 of the present invention.

Next, embodiment 4 will be described with reference to FIG. 9. FIG. 9 corresponds to FIG. 2 of embodiment 1, and the same parts are denoted by the same reference characters.

The motor 2 includes two sets of three-phase coil windings, and thus, two pairs of inverter circuits 3 ($3a$, $3b$) and two pairs of drive circuits ($11a$, $11b$) are independently provided.

Furthermore, two pairs of rotation angle sensors (a, b) for detecting the rotation angle of the motor 2, and two pairs 1, 2 of rotation angle detection circuits ($13a$, $13b$) are further provided.

That is, the inverter circuit $3a$, the drive circuit 11e, the rotation angle sensor a, and the rotation angle detection circuit $13a$ are provided for one set (U, V, W) in the motor 2, and similarly, the inverter circuit $3b$, the drive circuit $11b$, the rotation angle sensor b, and the rotation angle detection circuit $13b$ are provided for the other set (X, Y, Z) in the motor 2.

Therefore, in embodiments 1 and 2, when switching between the rotation angle sensors a, b is performed, switching between the drive circuits $11a$, $11b$ and switching between the inverter circuits $3a$, $3b$ are performed in synchronization therewith. As a result, switching is performed also for supply of power to the coil windings of the motor 2.

Accordingly, redundancy is achieved not only for the sensors but also for the drive circuits and the motor which is a target, and thus, complete dual system redundancy can be achieved. In addition, by performing the abnormality detection not only on the sensors but also on the drive circuits $11a$, $11b$ and the inverter circuits $3a$, $3b$, it is possible for the CPU 10 to, if any of these output circuits is abnormal, perform not only switching to the normal side but also dependent switching between the sensors. The switching method can also be performed by using both the normal cycle and a cycle longer than the normal cycle, as described in embodiments 1 and 2.

Figure 10:
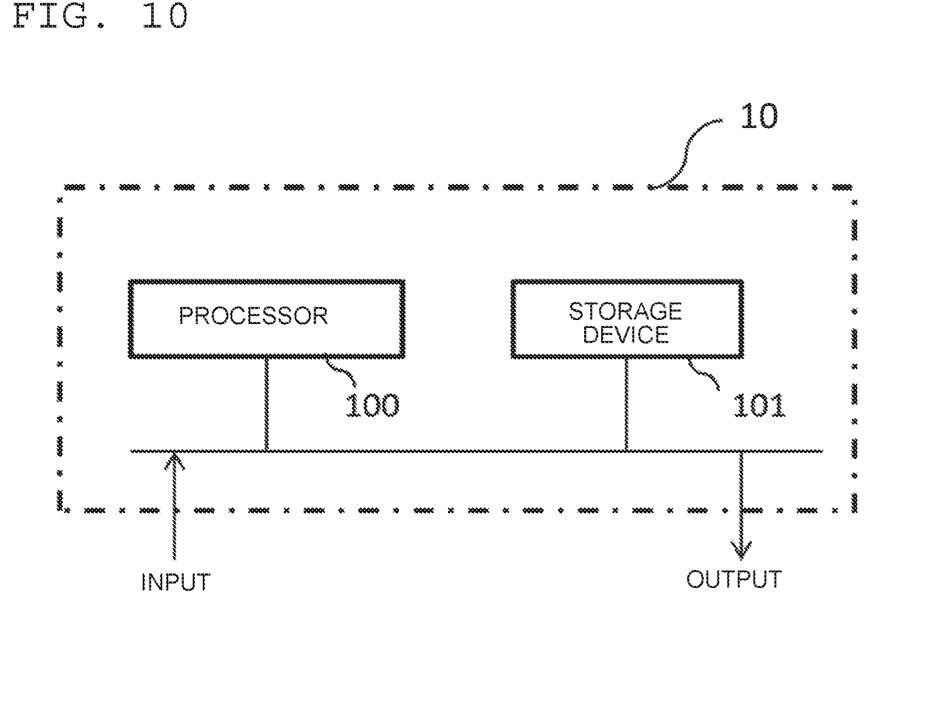
FIG. 10 shows an example of hardware of the CPU in embodiment 1 to 4 of the present invention.

FIG. 10 shows an example of hardware of the CPU 10. The CPU 10 is composed of a processor 100 and a storage unit 101 as shown in FIG. 10. The storage unit 101 includes, although not shown, a volatile storage device such as a random access memory, and a nonvolatile auxiliary storage device such as a flash memory. The storage unit 101 may include, instead of a flash memory, an auxiliary storage device such as a hard disk. The processor 100 executes a program loaded from the storage unit 101. In this case, the program is loaded from the auxiliary storage device to the processor 100 via the volatile storage device. The processor 100 may output data of the calculation result and the like to the volatile storage device of the storage unit 101, or may store the data in the auxiliary storage device via the volatile storage device.

The present invention is not limited to the above embodiments, but various design modifications can be made. Accordingly, within the scope of the present invention, the above embodiments may be freely combined with each other, or each of the above embodiments may be modified or simplified as appropriate.

DESCRIPTION OF THE REFERENCE CHARACTERS 1 control unit portion
2 motor
3 inverter circuit
3U, 3V, 3W arm circuits for respective phases
4 control board
5, $5a$, $5b$ rotation angle sensor
8 sensors
10 CPU
$10a$ switching means
$10b$ control amount computation means
11, $11a$, $11b$ drive circuit
12 input circuit
13 rotation angle detection circuit
$13a$, $13b$ interface circuit
14 power-supply switching element
15 abnormality determination means 15a, 15b abnormality monitoring portion
15c abnormality determination portion
17 filter
18 constant power supply circuit
30 capacitor
31, 32, 34 switching element

The invention claimed is:
1. An electronic control device comprising:
at least a pair of two detectors including a first detector and a second detector; and
a controller which controls a target by using information about the two detectors and which includes an abnormality determinator to perform determination as to abnormality of each of the two detectors, the controller to continue control with a normal one of the two detectors at a time of an abnormality, wherein
the controller executes control on a first detector,
the abnormality determinator performs, for the execution, detection of abnormality of the first detector at a normal speed and performs detection of abnormality of the second detector at a speed not higher than the normal speed, the abnormality determinator having at least two types of determination states including a sign of abnormality where an abnormality detected for a first time and an abnormality confirmation where after the first time the abnormality continues to be detected at a speed not higher than the normal speed, and,
in a case where the sign of abnormality of the first detector at the normal speed is detected, the controller performs switching to the second detector and continues the control, and
the abnormality determinator performs detection of abnormality of the second detector at the normal speed, and meanwhile, continues to perform detection of abnormality of the first detector at a speed not higher than the normal speed.

2. The electronic control device according to claim 1, wherein
the abnormality determinator continues detection of abnormality of the first detector at a speed not higher than the normal speed after the controller performs switching to the second detector within a period from the first time at which the sign of abnormality is detected to a time at which it is determined that the abnormality confirmation has occurred, and,
as a result, even if it fails to be determined that the abnormality confirmation has occurred in the first detector, the controller continues the control on the second detector.

3. The electronic control device according to claim 2, wherein a pair of two output circuits to drive the target are provided,
each of the two detectors is provided for the corresponding output circuit among the two output circuits, and,
when the controller performs switching from one of the two detectors to the other of the two detectors, the controller performs also switching from one of the two output circuits to the other of the two output circuits substantially at the same time.

4. The electronic control device according to claim 2, wherein the controller controls a motor of an electric power steering device, and
each of the two detectors is a rotation angle sensor to detect a rotation angle of the motor.

5. The electronic control device according to claim 1, wherein,
once performing switching to the second detector, the controller neither performs switching again within a predetermined time period even if a sign of abnormality of the second detector is detected within the predetermined time period, nor performs switching again within the predetermined time period even if the first detector is determined to be normal.

6. The electronic control device according to claim 5, wherein a pair of two output circuits to drive the target are provided,
each of the two detectors is provided for the corresponding output circuit among the two output circuits, and,
when the controller performs switching from one of the two detectors to the other of the two detectors, the controller performs also switching from one of the two output circuits to the other of the two output circuits substantially at the same time.

7. The electronic control device according to claim 5, wherein the controller controls a motor of an electric power steering device, and
each of the two detectors is a rotation angle sensor to detect a rotation angle of the motor.

8. The electronic control device according to claim 1, wherein
the abnormality determinator continues detection of abnormality of the first detector at a speed not higher than the normal speed after the controller performs switching to the second detector within a period from a time at which a sign of abnormality is detected to a time at which it is determined that an abnormality has occurred, and,
as a result, if it fails to be determined that an abnormality has occurred and if a deviation in output value between the two pairs of detectors is equal to or smaller than a predetermined value, the controller performs switching again and performs the control.

9. The electronic control device according to claim 8, wherein a pair of two output circuits to drive the target are provided,
each of the two detectors is provided for the corresponding output circuit among the two output circuits, and,
when the controller performs switching from one of the two detectors to the other of the two detectors, the controller performs also switching from one of the two output circuits to the other of the two output circuits substantially at the same time.

10. The electronic control device according to claim 8, wherein the controller controls a motor of an electric power steering device, and
each of the two detectors is a rotation angle sensor to detect a rotation angle of the motor.

11. The electronic control device according to claim 1, wherein a pair of two output circuits to drive the target are provided,
each of the two detectors is provided for the corresponding output circuit among the two output circuits, and,
when the controller performs switching from one of the two detectors to the other of the two detectors, the controller performs also switching from one of the two output circuits to the other of the two output circuits substantially at the same time.

12. The electronic control device according to claim 11, wherein the controller controls a motor of an electric power steering device, and
  each of the two detectors is a rotation angle sensor to detect a rotation angle of the motor.

13. The electronic control device according to claim 1, wherein a pair of two output circuits to drive the target are provided,
  each of the two detectors is provided for the corresponding output circuit among the two output circuits, and,
  when the controller performs switching from one of the two detectors to the other of the two detectors, the controller performs also switching from one of the two output circuits to the other of the two output circuits substantially at the same time.

14. The electronic control device according to claim 1, wherein the controller controls a motor of an electric power steering device, and
  each of the two detectors is a rotation angle sensor to detect a rotation angle of the motor.

15. The electronic control device according to claim 1, wherein the controller controls a motor of an electric power steering device, and each of the two detectors is a rotation angle sensor to detect a rotation angle of the motor.

16. An operation control method for an electronic control device including at least a pair of two detectors including a sensor, and a controller which controls a target by using information about the two detectors and which includes an abnormality determinator to perform determination as to abnormality of the two detectors, the controller to continue control with a normal one of the pair at a time of an abnormality,
  the abnormality determinator being included in a CPU, the operation control method comprising:
  performing abnormality detection on a first detector of a selected one of the two of detectors at a normal speed corresponding to a control amount computation cycle of the controller;
  confirming that the first detector is abnormal, if an abnormality count of the first detector is equal to or more than a predetermined count;
  performing abnormality detection on a second detector of the other of the pair of detectors at a speed not higher than the normal speed;
  confirming that the second detector is abnormal, if an abnormality count of the second detector is equal to or more than the predetermined count; and
  switching the detector to be used for the control from the first detector to the second detector if abnormality of the first detector being used for the control is detected or confirmed and if abnormality of the second detector is neither detected nor confirmed, on the basis of determination results of the abnormality detection and the abnormality confirmation.

17. The operation control method for the electronic control device according to claim 16, wherein,
  in performing the abnormality detection, if it fails to be determined that the abnormality confirmation has occurred and if a deviation between the two detectors is equal to or smaller than a predetermined value, the abnormality detection is cancelled.

18. The operation control method for the electronic control device according to claim 16, wherein a pair of two output circuits to drive the target are provided,
  each of the two detectors is provided for the corresponding output circuit among the two output circuits, and,
  when the controller performs switching from one of the two detectors to the other of the two detectors, the controller performs also switching from one of the two output circuits to the other of the two output circuits substantially at the same time.

19. The operation control method for the electronic control device according to claim 16, wherein
  the controller controls a motor of an electric power steering device, and
  each of the two detectors is a rotation angle sensor to detect a rotation.

* * * * *